March 25, 1958

T. A. WILKINSON 2,827,947

ADJUSTABLE SEAT SUPPORT

Filed April 27, 1954

INVENTOR.
Thomas A. Wilkinson.
BY
ATTORNEY.

United States Patent Office 2,827,947
Patented Mar. 25, 1958

2,827,947

ADJUSTABLE SEAT SUPPORT

Thomas A. Wilkinson, Oak Park, Mich., assignor to F. L. Jacobs Co., Detroit, Mich., a corporation of Michigan Application April 27, 1954, Serial No. 425,887

9 Claims. (Cl. 155—14)

This invention relates to seat supporting structures in general and has particular reference to a power operated fully adjustable supporting structure for the seat of an automotive vehicle or the like.

The general object of the invention is to provide a vehicle seat supporting structure by means of which the seat may be adjusted in a horizontal direction and also in a vertical direction from any selected horizontal position of the seat.

A further object of the invention is to provide a power operated adjustable vehicle seat support.

Another object of the invention is to provide an adjustable vehicle seat supporting structure in which an electric motor operated means is provided for adjusting the seat in a horizontal direction and in which a second electric motor operated means is provided for vertical adjustment of the seat.

Another object of the invention is to provide a motor operated seat adjuster which is relatively simple and compact in construction and economical to manufacture and install.

A further object of the invention is to provide an adjustable supporting structure for a vehicle seat in which the movement of the seat supporting frame both in horizontal and vertical direction will be equalized at opposite sides of the supporting frame.

Other and further objects of the invention will be apparent from the following description and claims and may be understood by reference to the accompanying drawings, of which there are two sheets, which by way of illustration show preferred embodiments of the invention and what I now consider to be the best mode in which I have contemplated applying the principles of my invention. Other embodiments of the invention may be used without departing from the scope of the present invention as set forth in the appended claims.

In the drawings:

Fig. 3 is a fragmentary perspective view of a modified form of the invention.

Figure 1:
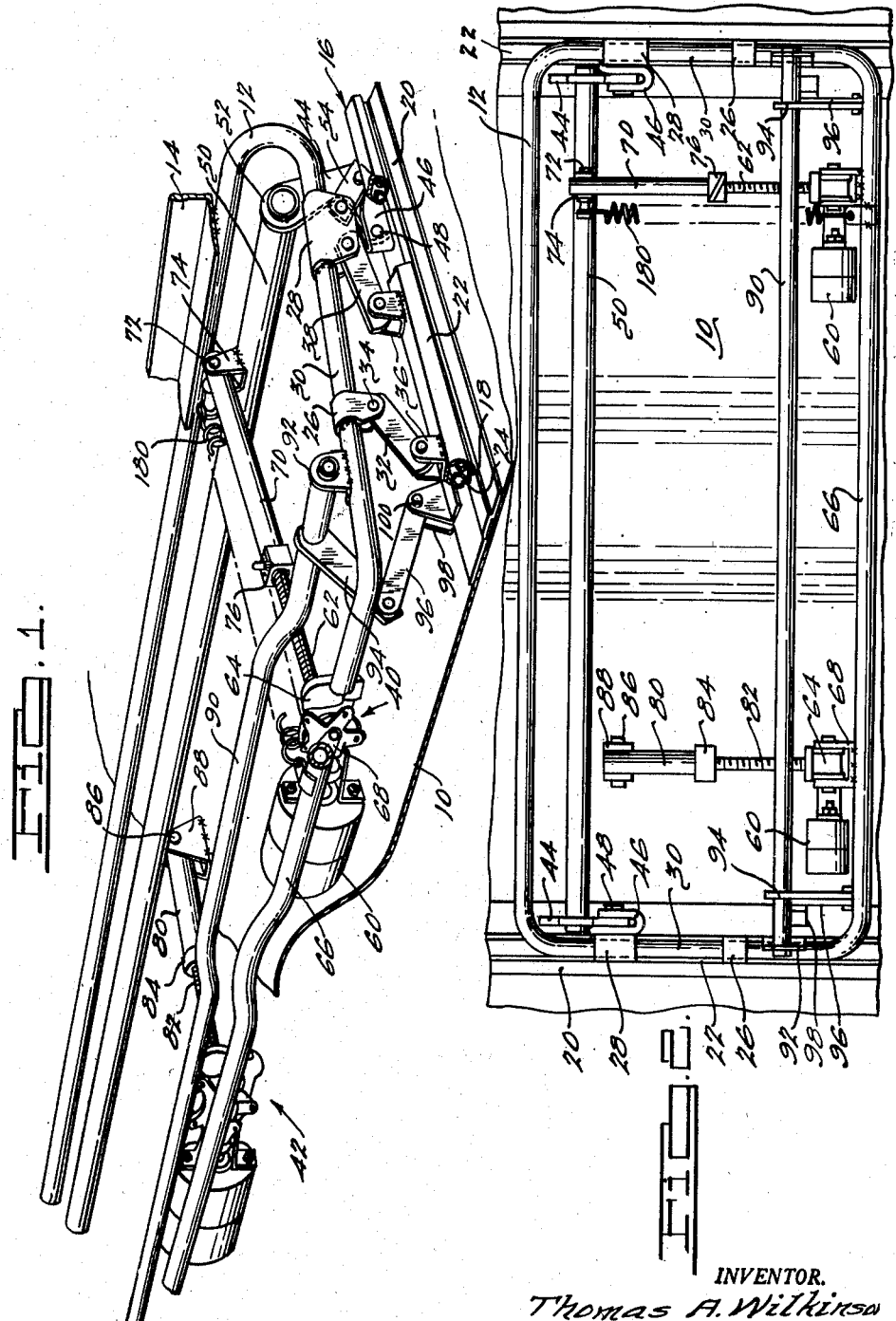
Fig. 1 is a fragmentary perspective view of my improved seat adjusting mechanism.
Figure 2:
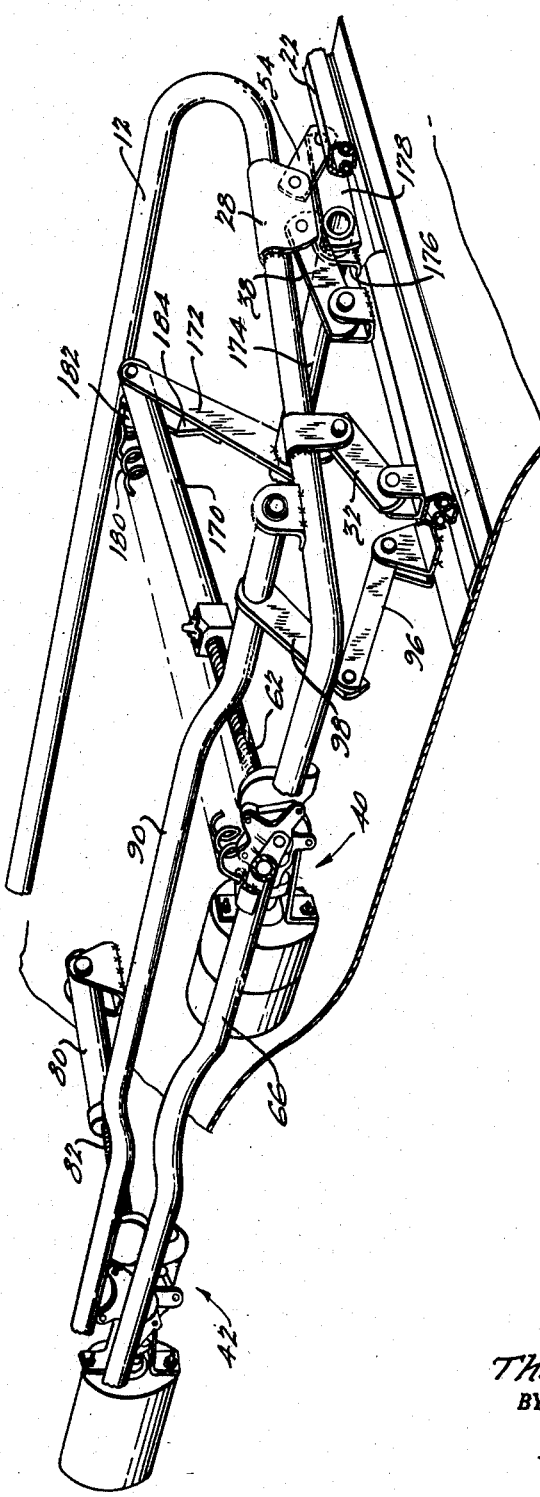
Fig. 2 is a top plan view of the device.

In Figs. 1 and 2, there is disclosed a portion of the floor 10 of an automotive vehicle and a seat supporting frame 12 mounted on the floor 10 for horizontal sliding movement forwardly and rearwardly over the floor 10 and also adapted to be adjusted vertically relative to the floor 10. The seat supporting frame 12 may comprise a substantially rectangular frame having a suitable framework indicated at 14 welded or otherwise secured thereto on which the seat cushion (not shown) may be mounted.

The supporting structure for the seat frame 12 includes a pair of spaced parallel track elements 16 extending longitudinally of the vehicle floor 10 and disposed below the sides of the rectangular seat frame 12. Each track element 16 comprises a channel section 18 secured to a plate 20 mounted on the vehicle floor 10 and an inverted channel section 22 telescoped over the track section 18 with a plurality of balls 24 disposed between the opposing flanges of the telescoped track sections 18 and 22 so that the upper track section 22 is freely slidable on the fixed track section 18.

A pair of mounting brackets 26 and 28 are welded or otherwise secured to the sides 30 of the supporting frame 12. A link member 32 is pivoted to bracket 26 by means of a pin 34, and at its other end, the link 32 is pivoted to a bracket 36 which is secured to the upper surface of the movable track section 22. A second link member 38 is pivoted at one end to bracket 28, and at its other end is pivoted to a second bracket 36 secured to the movable track section 22. The supporting linkage thus far described is duplicated at the other side of the supporting frame, and the links 32 and 38 provide a parallelogram like support for the seat supporting frame 12.

A power operated means indicated at 40 provides for vertical adjustment of the seat frame 12, and a similar power operated means 42 provides for forward and rearward adjustment of the seat frame 12.

The means providing for vertical adjustment of the seat includes a bell crank lever 44 at each side of the seat frame 12. Each bell crank lever 44 is pivoted at one end to a bracket 46 by means of a pin 48. The brackets 46 are secured to the movable track sections 22. An equalizer or torque bar 50 is non-rotatably secured to the upper ends 52 of the crank levers 44, and a link 54 is pivoted to an intermediate portion of each lever 44 and to the adjacent bracket 28.

The power operated means 40 may comprise an electric motor 60 adapted to drive a jack shaft 62 through a suitable gear reduction unit 64 interposed between the motor shaft and the jack shaft 62. The electric motor 60 and the speed reducing unit 64 are pivotally mounted on the front edge 66 of the seat frame 12 by means of a bracket 68. The jack shaft is telescoped within a sleeve 70 which is pivoted by means of a pin 72 to a U-shaped bracket 74 secured adjacent one end of the torque bar 50. A motion transmitting element 76 in the nature of a traveling nut is rigidly secured to the end of sleeve 70, and the device 76 cooperates with the threads or helical grooves formed on the jack shaft 62 to effect telescoping movement of the shaft 62 and sleeve 70 upon rotation of the shaft 62 by the electric motor 60. The motion transmitting device 76 may be a simple traveling nut of conventional form or may comprise a plurality of ball bearings enclosed within a suitable housing and adapted to roll on the threads of the jack screw 62. The electric motor 60 is a reversible motor so that the jack shaft may be driven in either direction to provide movement of the traveling nut device 76 in either direction on the shaft 62.

From the description of the supporting structure thus far given, it will be seen that operation of the motor 60 to rotate jack shaft 62 in one direction will effect sliding of the sleeve 70 on the shaft toward the motor unit with resultant pivoting of bell crank levers 44 in a counterclockwise direction (Fig. 1) about pins 48 which connect the levers 44 to track sections 22. Upon pivotal movement of levers 44, the links 54 react against brackets 28 and the supporting frame 12 to effect pivotal movement of frame 12 on links 32 and 38 which are connected between the sides of the frame and the movable track section 22, thus elevating the seat supporting frame 12 relative to the vehicle floor 10. In the arrangement disclosed, the link 38 is inclined more closely to the horizontal than link 32 so that the rear edge of the seat frame 12 will be elevated a slightly greater amount than the front edge 66 of the frame. Elevation of frame 12 on links 32 and 38 will be accompanied by a slight forward shifting of the frame 12 relative to the track section 22, but this forward shifting of the frame during elevation thereof is compensated for by other means to be described hereinafter.

The motor unit 42 may be similar in construction to the vertical motion power unit 40 already described, and the unit 42 is pivotally supported on the front edge 66 of the seat frame 12. The sleeve 80 which is movable along the jack shaft 82 driven by the motor unit 42 is illustrated as including a simple traveling nut device 84 rather than the antifriction motion transmitting means 76 shown in connection with the vertical power unit, since there is less friction involved in operation of the horizontal motion power unit than in operation of the vertical power unit. The sleeve 80 is pivotally connected by means of pin 86 to a bracket 88 which is secured to the vehicle floor.

The horizontal power operated means 42 is connected between the vehicle floor and the seat frame 12 as described, and upon energization thereof, the seat frame 12 will be shifted forwardly or rearwardly over the vehicle floor depending upon the direction of rotation of the motor. During horizontal shifting of the seat frame, the links 32 and 38, and the brackets 46, bell crank levers 44, and links 54, as well as the vertical motion power means 40, will remain in fixed position relative to the seat frame 12 and the movable track section 22, and the entire assembly will slide as a unit with track section 22 over the fixed track 18 so that the elevation and angular position of the seat frame 12 will not be changed during horizontal shifting of the seat frame. It will be apparent that during operation of the horizontal drive unit 42, the vertical motion unit 40 locks the frame 12 against movement relative to the movable seat track 22, since the actuating linkages comprising bell chanks 44 and links 54 cannot be actuated when the vertical motion unit 40 is de-energized. Similarly, when the horizontal motion unit 42 is de-energized and the vertical motion unit 40 is operated, the distance between the pivot 86 and the front edge 66 of the seat frame remains constant, although the edge 66 of the seat frame may swing in an arc about pivot 86 at such time. Consequently, it is not possible for the seat frame 12 to shift in a horizontal direction relative to the floor of the vehicle when the vertical motion unit is actuated. Since the seat frame 12 must shift in a horizontal direction relative to the movable track 22 during elevation or lowering of the frame as previously described, it will be apparent that elevation of the frame by actuation of the vertical motion unit will result in a slight rearward sliding of the track section 22 on the fixed track 18, so that the tendency of the frame to be shifted horizontally forwardly by actuation of supporting links 32 and 38 is compensated for by the slight rearward shifting of the movable track 22 on the fixed track 18. Similarly, lowering of the frame upon actuation of the vertical motion power unit effects a slight horizontal rearward shifting of the frame 12 relative to the tracks 22, and such horizontal shifting of the frame is compensated for by sliding of the tracks 22 forwardly along the fixed tracks 18. It will be seen, therefore, that the actuation of the vertical power unit in either direction results in a substantially vertical motion with no horizontal shifting of the seat frame, regardless of what horizontal position the frame may be in when the frame is elevated or lowered.

Equalizing bar 90 is provided for equalizing movement of the seat frame at opposite sides of the vehicle during horizontal adjustment of the frame. The opposite ends of the torque bar 90 are rotatably journalled in the brackets 92 secured to the opposite sides 30 of the frame 12. Adjacent each end of the torque bar 90 and inwardly of the brackets 92 is a crank arm 94 which is welded or otherwise rigidly secured to the bar 90. Links 96 are pivoted at one end to the other ends of crank arms 94, the other ends of links 96 being pivoted to brackets 98 secured to the mounting plates 20 which are mounted on the vehicle floor.

During operation of the horizontal power unit 42 the torque bar 90 will, of course, shift in a horizontal direction with frame 12, and since the bar 90 is rotatably journalled in brackets 92 carried by the frame, the bar 90 will be rotated in one direction or the other due to the change in the relative positions of the axis of bar 90 and the axis of the pins 100 which pivotally connect the links 96 to the fixed brackets 98. As shown in Fig. 2, the horizontal motion power unit is mounted adjacent one side of the supporting frame 12, and the force exerted on the frame upon energization of the horizontal power unit will readily effect sliding of the adjacent side of the seat frame along the fixed track, but some binding of the opposite side of the frame would result if the equalizing means provided by the torque bar 90 and cranks 94 and links 96 were not provided. Since the crank arm 94 at the side of the frame adjacent the horizontal power unit is rotated during horizontal shifting of the frame, the other crank arm 94 at the opposite side of the frame must be rotated a similar amount, and rotation of such crank arm 94 transmits the sliding movement to that side of the frame and equalizes the sliding movement at opposite sides of the frame.

In the modification disclosed in Fig. 3 the construction and operation of the device is essentially the same as described in connection with the Fig. 1 modification, and accordingly similar reference numerals are employed in Fig. 3 where appropriate. In this modification, the construction and operation of the means for providing horizontal adjustment of the seat frame 12 is identical to that previously described, but the linkage between the vertical motion power unit 40 and the supporting frame 12 has been modified. The movable part 170 of the vertical motion unit 40 in the Fig. 3 modification is pivotally connected to one end of a crank arm 172 which is welded or otherwise secured to the vertical motion torque bar 174 which is similar to the torque bar 50 described in Fig. 1. The ends of the torque bar 174 are journalled in brackets 176 secured on movable track member 22, and levers 178 corresponding to bell crank levers 44 described in Fig. 1 are rigidly secured on the outer ends of the torque bar 174 and are rotatable with the torque bar 174 upon actuation of the vertical motion power unit. Links 54 connect the outer ends of cranks 178 to brackets 28, and upon actuation of the vertical motion unit, the crank 172 and torque bar 174 are rotated about the axis of the torque bar to rotate crank arms 178 and through links 54 effect vertical motion of frame 12 on supporting links 32 and 38. A spring 180 is connected between the front edge 66 of the supporting frame 12 and a pin 182 projecting laterally from an arm 194 integral with or secured to crank arm 172. The spring 180 may be omitted if desired, but may be provided for the purpose of aiding the power unit in effecting elevation of the supporting frame. The construction of the embodiment shown in Fig. 3 is otherwise the same as that shown in Fig. 1. A similar spring may be provided, if desired, in the Fig. 1 modification.

In both of the modifications described above, stop means may be provided for limiting horizontal shifting of the frame in both directions and for limiting vertical adjustment of the frame, and while such stop means have not been illustrated, a suitable form thereof will be readily suggested to those skilled in the art.

The electrical circuits controlling the electric motors are energized or de-energized by operation of suitable operator controlled switches, and it will be apparent that the motor circuits may be controlled by separate switches or by a single switch having a plurality of operative positions.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:
1. In a seat supporting structure, a seat supporting frame, a track element at each side of said frame slidable along a supporting surface, link members pivotally connecting said frame to said track elements and providing for vertical adjustment of said frame relative to said track elements, lever means at each side of said frame pivoted at one end to said track elements, link means pivotally connecting the intermediate portion of said levers to said frame, an equalizing bar connecting the other ends of said levers at a point spaced from the pivot points of said levers on said track elements, and motor means, including a motor and an extensible and retractable power transmitting means driven by said motor and reacting against said bar to pivot said levers about their connection with said track elements and thereby effect vertical movement of said frame on said link members.

2. A seat supporting structure according to claim 1 wherein said motor means when de-energized locks said lever means against movement to maintain said frame in a selected vertical position.

3. A seat supporting structure according to claim 1 wherein said frame, said link members, said lever means and said motor means are slidable as a unit with said track elements.

4. A seat supporting structure according to claim 1 wherein said motor means reacts between said frame and said equalizing bar and is disposed adjacent one side of said frame.

5. A seat supporting structure according to claim 3 including a second motor means reacting between said frame and a fixed element and operable upon energization thereof to effect sliding of said track elements along said supporting surface.

6. A seat supporting structure according to claim 4 including a spring reacting between said frame and said equalizing bar and tending to pivot said bar and lever means in a direction to elevate said frame.

7. In a seat supporting structure, a seat supporting frame, a track element at each side of said frame, link members pivotally connecting said frame to said track elements and providing for vertical adjustment of said frame relative to said track elements, a pair of bell crank levers each pivotally connected at one end to a track element, an equalizing bar connecting the other ends of said levers, link means pivoted to said frame and to intermediate portions of said levers, and extensible and retractable motor operated means reacting between said frame and said equalizing bar and operable upon energization thereof for pivoting said levers about their connections with said track elements to effect pivoting of said frame and link members.

8. In a seat supporting structure, a seat supporting frame, a track element at each side of said frame, link members pivotally connecting said frame to said track elements and providing for vertical adjustment of said frame relative to said track elements, a pair of levers each pivotally connected at one end to a track element, an equalizing bar connecting said levers at their other ends for movement in unison, link means pivoted to intermediate portions of said levers and reacting against said frame, and extensible and retractable motor operated means reacting against said equalizing bar and operable upon energization thereof for pivoting said levers about their connections with said track elements to effect vertical adjustment of said frame on said link members.

9. A seat supporting structure according to claim 8 including means connected between said frame and a fixed element for preventing horizontal shifting of said frame during vertical adjustment thereof by said motor operated means.

References Cited in the file of this patent
UNITED STATES PATENTS

| | | |
|---|---|---|
| 2,129,952 | Lustig | Sept. 13, 1938 |
| 2,345,182 | Corber | Mar. 28, 1944 |
| 2,500,742 | Taylor | Mar. 14, 1950 |
| 2,633,578 | Deves et al. | Apr. 7, 1953 |
| 2,684,108 | Rappl | July 20, 1954 |

FOREIGN PATENTS

| | | |
|---|---|---|
| 455,159 | Italy | Feb. 14, 1950 |